Aug. 13, 1963  H. BERGHÖFER ET AL  3,100,619
GAS CONNECTION TAP WITH HOSE CONNECTION PART
Filed May 13, 1960
2 Sheets-Sheet 1
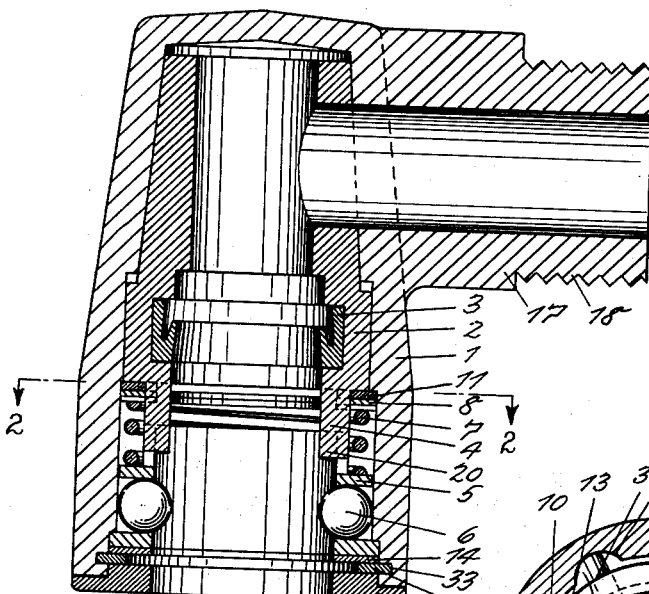
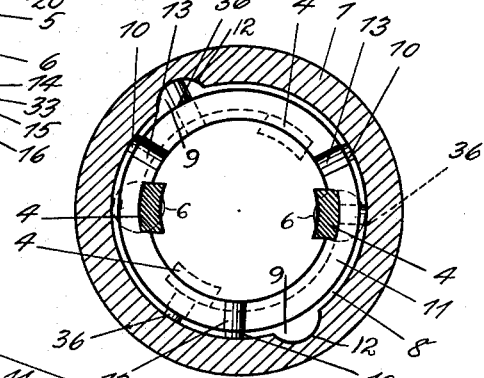
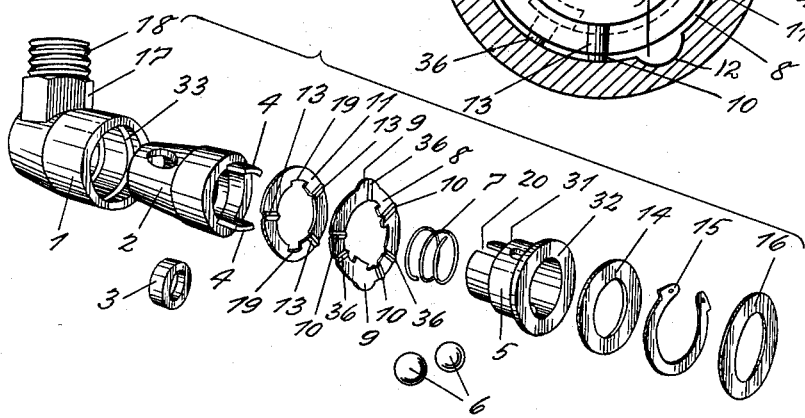
INVENTORS
HANS BERGHÖFER
HERBERT GRIEBEL
BY
Michael S. Striker
Attorney INVENTORS
HANS BERGHÖFER
HERBERT GRIEBEL
BY
Michael S. Striker
Attorney ID 3,100,619
GAS CONNECTION TAP WITH HOSE
CONNECTION PART
Hans Berghöfer, Alte Landstrasse 274, Hamburg-Poppenbuttel, Germany, and Herbert Griebel, Eilbeker Weg 79a, Hamburg-Eilbek, Germany
Filed May 13, 1960, Ser. No. 28,931
Claims priority, application Germany Jan. 2, 1960
3 Claims. (Cl. 251—149.9)

There are plug couplings known for quickly connecting gas fed appliances to a gas line, in which the socket to be attached to the gas tube is fitted with bayonet pins in order to insure a firm connection with the tap, and to operate the cock. Some other models show the connection socket of the hose provided with a circular groove. The connection with the gas tap is effected by pushing back a ring held by spring force and carrying in conical bores several balls, part of which protrude into the interior of the tap. Thereby the balls are released to just such as extent to permit the insertion of the socket into the tap. By a release of the ring carrying the balls, the balls are pressed back again inwardly whereby they engage in the ring groove of the socket to hold the latter in place. This system, however, allows the coupling only with both hands. The tap is then actuated by turning the ball holding ring. But either method is unsuitable for mounting the coupling concealed in a wall. According to the invention the drawbacks inherent with both methods are now removed, and coupling with one hand as well as concealed mounting is made possible.

The drawings illustrate the invention by way of example.

Figure 4:
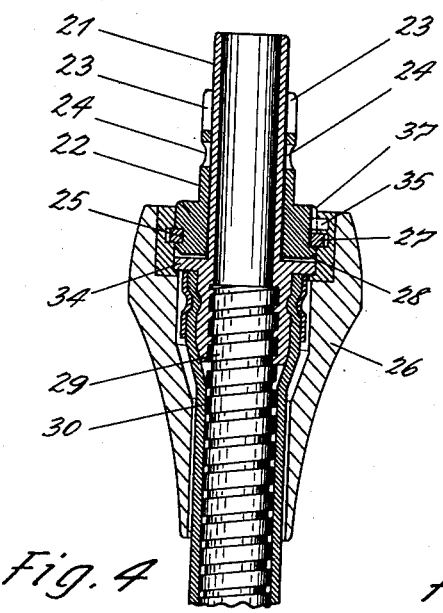
Figure 5:
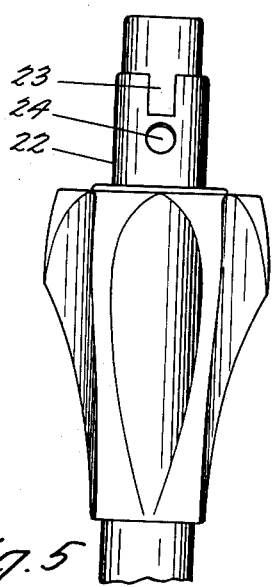
Figure 6:
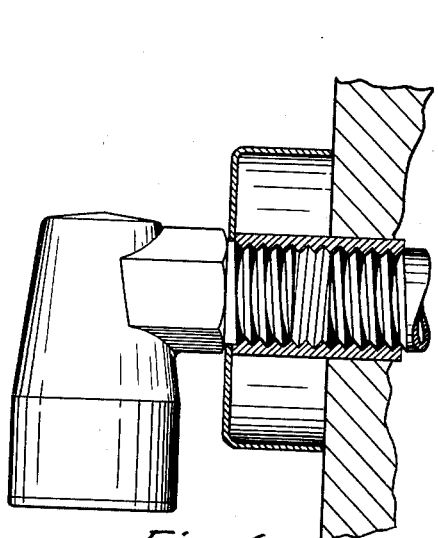
Figure 7:
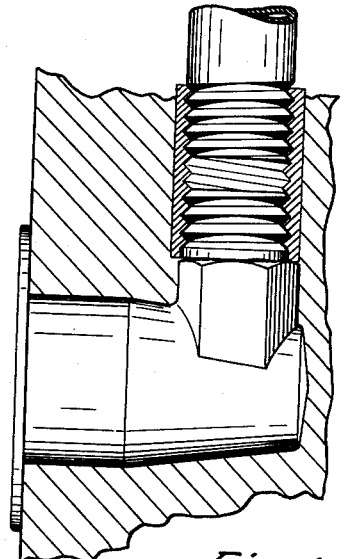

FIG. 1 shows a longitudinal section through the gas connection tap,

FIG. 2 is a cross sectional view of the gas connection tap taken along the line 2—2 of FIG. 1 and viewed in direction of the arrows, FIG. 3 is an exploded perspective view of the individual parts of the connection, FIG. 4 is a section through the tube connection plug, FIG. 5 is an elevation of the plug's front parts with the socket twisted through 90°, FIG. 6 shows the tap according to FIGS. 1 and 2 installed on plaster or brickwork, and FIG. 7 shows the tap in plaster or brick.

The gas connection tap according to the invention consists, as shown in FIGS. 1 and 2, of the casing or housing 1 with the ball grooves 12, the cock of the tap 2 with operation cams 4, the gasket 3, the ball basket 5 with the balls 6, the pressure spring 7, the ring 8 with holding noses 9 and notch grooves 10, notch ring 11 with its recesses 19 and its notch noses 13, slide ring 14, snap ring 15 and the cover 16 and a hexagonal portion 17 projecting transversely from one end of the housing and ending in an exteriorly threaded connection piece 18. The hose connection piece consists, as shown in FIG. 4 of the hose socket 21 for hose 29, 30, the turn- and fixing socket 22, with its recess 23, its conical surface for sliding 28, and the anti-torsion safety groove 29 with its holes 24, holding grooves 25 and handle 26 with its inland square spring wire 27.

Assembly of the Gas Connection Tap

Gasket 3 is inserted into the cock 2 as shown in FIG. 1. Then the notch ring 11 is pushed over the cams 4 of the cock 2 with the cams 4 located in the fitting recesses 19 of the ring 11 until the latter rests on the end face of the cock 2 with the three noses of the ring which are staggered by 120° facing away from the cock 2. The whole is then inserted into casing 1. The ring 8 is then inserted into the casing 1 so that its holding noses 9 are held in ball grooves 12 (see also FIG. 2) to prevent twisting until it rests with its notch grooves 10, which are staggered through 120°, on notch noses 13 of notch ring 11. Then pressure spring 7 is put into the housing 1. One end of this spring 7 rests against ring 9 and the other against the corresponding rim 31 of a ball basket 5. This latter, with its balls 6 (see FIG. 1), is so assembled with the housing 1 and the cock 2 that the balls are located in ball grooves 12 (see also FIG. 2) and that its recesses 20 partly receive the same.

Now, slide ring 14 is mounted on the rim 32, and this whole lightly pushed against the pressure of spring 7 into casing 1 whereby it is made possible to easily put snap ring 15 on 14 and thus force the snap ring into groove 33 of casing 1 (see FIG. 1). Thereupon cover 16 is firmly pressed into the casing 1 (see FIG. 1). The so-assembled connection tap can be installed into or upon walls as shown in FIGS. 6 and 7, respectively.

FIG. 4 shows the tube connection plug in its entirety with the tube ends 29 (metal tube) and 30 (plastic tube). The handle 26 with the inlaid square spring wire 27 is slid on a safety gas hose 29, 30 in such a way that the hose end protrudes from the handle 26 through the large diameter end of the bore therethrough. Thereupon the hose socket 21 with its stop flange 34 is fitted to the hose in a conventional manner. Then the turn- and fixing socket 22 is put on to hose socket 21 so that its reinforced end comes to lie against stop flange 34 of hose socket 21.

Now, the handle 26 is pushed to the end of the hose until an inner shoulder face of the handle abuts against the other side of stop 34 whereby the square wire 27 already inserted in handle 26 is first expanded by engagement with the conical plate face 28 of the turn- and fixing socket 22 to snap then into the holding groove 25 of the socket 22. By means of a pin 35 engaging with one end in groove 37 the connection is secured against twists in the usual manner.

The device works as follows:

Tube socket 21 with the turn- and fastening socket 22 is inserted into the opening of the gas connection tap (FIG. 1) so that the recesses 23 of the turn- and fastening socket 22 partly receive the actuating cams 4 of cock 2, whereby the holes 24 of the turn- and fastening socket 22 will be aligned, at the same time, with the balls 6 (FIG. 5). By turning handle 26 and ball basket 5 to the left, according to FIG. 2, the recesses 23, by means of the actuating cams 4 take cock 2 and ball socket 5 along in such a way that the balls 6 are pushed out of the ball grooves 12 into the holes 24 of the turn- and fastening socket 22, that is into the position illustrated in FIG. 1.

At the same time, however, the noses 13 (FIG. 3) of notch ring 11 which by means of the recesses 19 is also taken along by the actuating cams 4 during turning of the latter, slip out of the notch grooves 10 of ring 8, which is engaged with notch ring 11 through the action of the pressure of spring 7 and prevented from turning by means of its holding noses 9 engaged in the ball grooves 12, to then, after a turning of 30°, snap into the grooves 36 provided for the "closed" position of the tap, to thus become arrested. On turning further, the process described repeats itself but the engagement this time is effected in the "open" position of the tap after a total twist of 120°. As the tap is turned back and thereby closed, the notch grooves and notch noses engage again, first in "closed" position, and on turning further, also with "closed" tap in the uncoupled position.

The mechanism can be mounted, as shown in FIG. 6, exposed, that is upon brickwork, or, as shown in FIG. 7, buried in the brickwork or under the plaster.

What we claim is:
1. Combined hose coupling and cock operating mechanism comprising, in combination, a housing formed with an axial bore having an open and a closed end and a transverse bore communicating with said axial bore adjacent said closed end thereof, said housing being also formed in the region of said open end of said axial bore with at least one axial groove; a cock member fitted in said axial bore of said housing and being formed with a first passage therethrough coaxial with said axial bore and a second passage communicating with the first passage, said cock member being turnable in said housing about the axis of said axial bore between a closed position, an intermediate coupling position and an open position and said second passage communicating with the transverse bore only in said open position of said cock member; hose means having an attaching end insertable through said open end of said axial bore of said housing in said first passage of said cock member when the latter is in said closed position; first coupling means in said open end of said axial bore of said housing and connected to said cock member for rotation therewith, said first coupling means including a ball cage connected to said cock for rotation therewith and at least one ball held in said ball cage for rotation therewith and movable in radial direction between a coupling position in which a portion of said ball protrudes beyond an inner surface of said ball cage and an uncoupling position, said ball cage being connected to said cock so that said ball is aligned with said axial groove when said cock is in said closed position thereof permitting said ball to move radially outwardly to said uncoupling position thereof; and second coupling means fixed to said attaching end of said hose means and cooperating with said first coupling means upon insertion of said attaching end of said hose means into said cock for connecting said cock to said hose means for turning movement therewith, said second coupling means being formed with a cavity aligned with said ball when said attaching end of said hose means is inserted into said cock, whereby upon turning of said cock member by said hose means from said closed to said coupling position said ball will be moved out of said groove to the coupling position thereof into said cavity of said second coupling means so as to prevent separation of said hose means from said cock member upon turning of said cock by said hose means from said closed to and beyond said coupling position.

2. Combined hose coupling and cock operating mechanism comprising, in combination, a housing formed with an axial bore having an open and a closed end and a transverse bore communicating with said axial bore adjacent said closed end thereof, said housing being also formed in the region of said open end of said axial bore with at least one axial groove; a cock member fitted in said axial bore of said housing and being formed with a first passage therethrough coaxial with said axial bore and a second passage communicating with the first passage, said cock member being turnable in said housing about the axis of said axial bore between a closed position, an intermediate coupling position and an open position and said second passage communicating with the transverse bore only in said open position of said cock member; hose means having an attaching end insertable through said open end of said axial bore of said housing in said first pasage of said cock member when the latter is in said closed position; first coupling means in said open end of said axial bore of said housing and connected to said cock member for rotation therewith, said first coupling means including a ball cage connected to said cock for rotation therewith and at least one ball held in said ball cage for rotation therewith and movable in radial direction between a coupling position in which a portion of said ball protrudes beyond an inner surface of said ball cage and an uncoupling position, said ball cage being connected to said cock so that said ball is aligned with said axial groove when said cock is in said closed position thereof permitting said ball to move radially outwardly to said uncoupling position thereof; second coupling means fixed to said attaching end of said hose means and cooperating with said first coupling means upon insertion of said attaching end of said hose means into said cock for connecting said cock to said hose means for turning movement therewith, said second coupling means being formed with a cavity aligned with said ball when said attaching end of said hose means is inserted into said cock, whereby upon turning of said cock member by said hose means from said closed to said coupling position said ball will be moved out of said groove to the coupling position thereof into said cavity of said second coupling means so as to prevent separation of said hose means from said cock member upon turning of said cock by said hose means from said closed to and beyond said coupling position; and positioning means for resiliently maintaining said cock member in said positions thereof while permitting turning of said cock member between said positions thereof.

3. Combined hose coupling and cock operating mechanism comprising, in combination, a housing formed with an axial bore having an open and a closed end and a transverse bore communicating with said axial bore adjacent said closed end thereof, said housing being also formed in the region of said open end of said axial bore with at least one axial groove; a cock member fitted in said axial bore of said housing and being formed with a first passage therethrough coaxial with said axial bore and a second passage communicating with the first passage, said cock member being turnable in said housing about the axis of said axial bore between a closed position, an intermediate coupling position and an open position and said second passage communicating with the transverse bore only in said open position of said cock member; hose means having an attaching end insertable through said open end of said axial bore of said housing in said first passage of said cock member when the latter is in said closed position; first coupling means in said open end of said axial bore of said housing and connected to said cock member for rotation therewith, said first coupling means including a ball cage connected to said cock for rotation therewith and at least one ball held in said ball cage for rotation therewith and movable in radial direction between a coupling position in which a portion of said ball protrudes beyond an inner surface of said ball cage and an uncoupling position, said ball cage being connected to said cock so that said ball is aligned with said axial groove when said cock is in said closed position thereof permitting said ball to move radially outwardly to said uncoupling position thereof; second coupling means fixed to said attaching end of said hose means and cooperating with said first coupling means upon insertion of said attaching end of said hose means into said cock for connecting said cock to said hose means for turning movement therewith, said second coupling means being formed with a cavity aligned with said ball when said attaching end of said hose means is inserted into said cock, whereby upon turning of said cock member by said hose means from said closed to said coupling position said ball will be moved out of said groove to the coupling position thereof into said cavity of said second coupling means so as to prevent separation of said hose means from said cock member upon turning of said cock by said hose means from said closed to and beyond said coupling position; and positioning means for resiliently maintaining said cock member in said positions thereof while permitting turning of said cock member between said positions thereof, said positioning means comprising a first ring coaxial with said cock member and connected thereto for rotation therewith and having a first abutment face substantially normal to the ring axis, a second ring fixed to said housing and having a second abutment face substantially parallel to the first abutment face, one of said rings being formed in the abutment face thereof with a plurality of angularly displaced indentations, and a plurality of angularly displaced projections on the abutment face of the other ring adapted to engage in said indentations, respectively, when said cock member is in the respective positions thereof, and spring means operatively connected to one of said rings for resiliently pressing the abutment face of said one ring against the abutment face of the other ring.

References Cited in the file of this patent

UNITED STATES PATENTS

| | | |
|---|---|---|
| 2,099,335 | Hansen | Nov. 16, 1937 |
| 2,423,069 | McElhuse | June 24, 1947 |
| 2,461,699 | Scheiwer | Feb. 15, 1949 |
| 2,514,717 | Power | July 11, 1950 |

FOREIGN PATENTS

| | | |
|---|---|---|
| 236,510 | Germany | July 7, 1911 |
| 186,079 | Austria | July 10, 1956 |